United States Patent Office 3,182,670
Patented May 11, 1965

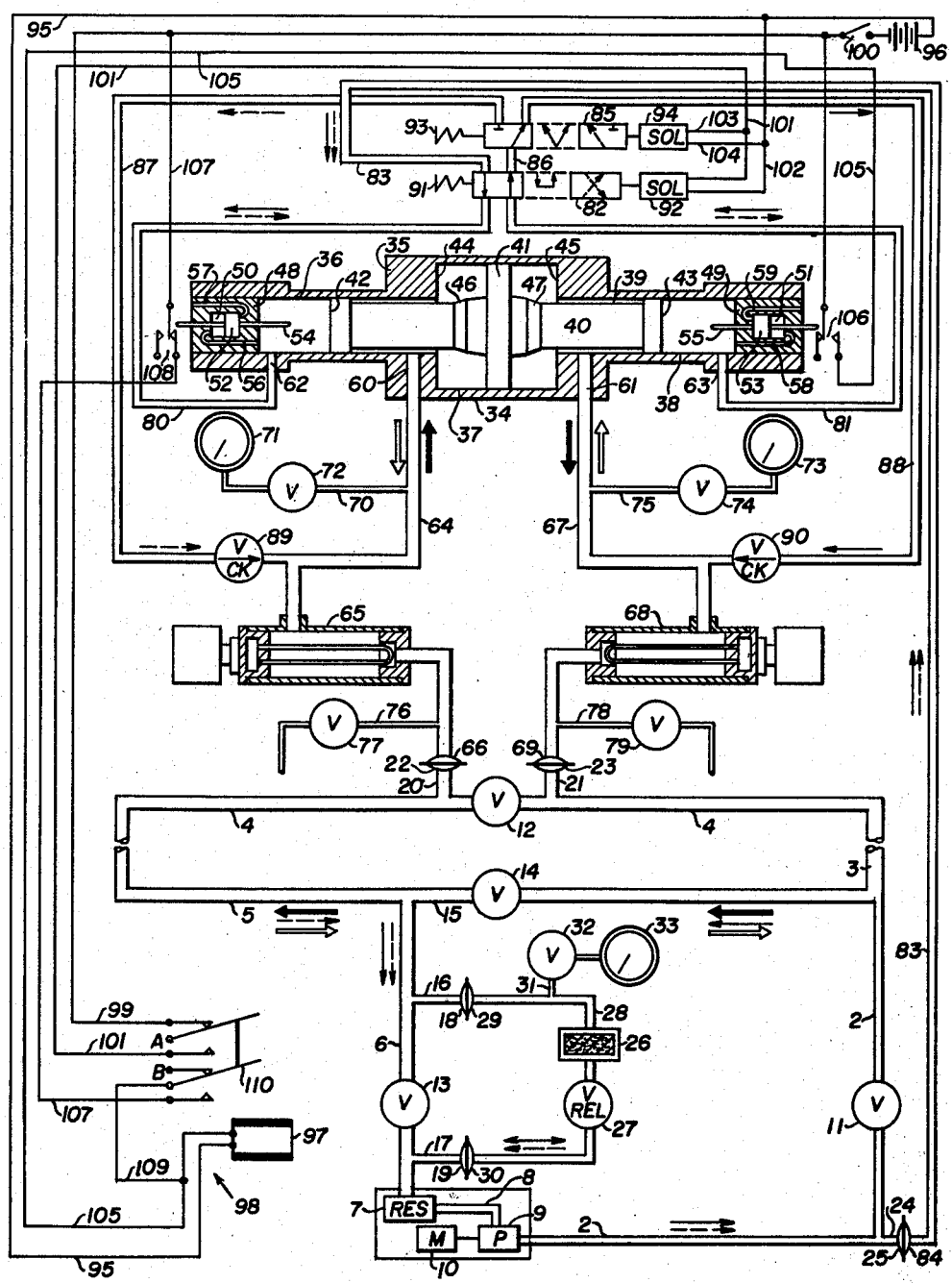

3,182,670
MEANS FOR DECONTAMINATING
FLUID SYSTEMS
Richard A. Howell, Glenarm, Md., assignor to Martin-Marietta Corporation, New York, N.Y., a corporation of Maryland
Filed Jan. 16, 1963, Ser. No. 251,869
10 Claims. (Cl. 134—107)

This invention relates to the decontamination of fluid systems and, more particularly, to an apparatus which permits contamination to be effectively flushed from such systems without requiring the use of an auxiliary fluid pressure source.

Over a period of time foreign particles will form or collect in any fluid system and, unless effective steps are taken to remove such contamination, system operation will ultimately deteriorate and in some cases become completely disrupted. These foreign particles may develop from a source internal of the fluid system or enter into the fluid system through various means. Typical of the internal sources of such particles are the inner walls of the conduits, moving parts of the system such as pumps, etc., and, in some cases, even filters employed in the system, the fibers of which may migrate into the fluid. Foreign particles may be introduced into the system through various system vents or whenever fluid is added or a line opened for any reason.

The limitations of prior art techniques for decontaminating fluid systems often necessitate the disassembly of the system in order that the various components thereof may be individually decontaminated. In such cases, after disassembly, the individual components are subjected to a conventional type of decontamination process such as, for instance, ultrasonic cleaning. However, component level decontamination is an extremely expensive and time-consuming process and, in many cases, a practical impossibility.

In order to keep frictional losses within fluid systems at a minimum, such systems are normally designed to produce a laminar flow of the fluid therethrough. Laminar fluid flow is characterized by a continuous steady motion of the fluid particles, the motion of fluid particles at any fixed point within the system always remaining constant. Consequently, laminar flow produces very little flushing effect within the fluid system. In contrast thereto it has been heretofore recognized that a turbulent fluid flow, characterized by an unsteady and non-uniform motion of the fluid particles whereby the motion of the particles at any fixed point in the system varies in no definite manner, is extremely effective in flushing contamination in fluid systems.

The dimensionless character of fluid flow through a tube is represented by its Reynold's Number which may be expressed by the following equation:

$$Re = \frac{VD}{\nu}$$

wherein:

$Re$ = Reynold's Number
$V$ = Velocity (inches/second)
$D$ = Tube diameter (inches)
$\nu$ = Kinematic viscosity (inches²/second)

In addition the velocity of the fluid may be expressed in terms of the following equation:

$$V = \frac{Q}{A}$$

wherein:

$V$ = Velocity (inches/second)
$Q$ = Rate of fluid flow (cu. inches/second)
$A$ = Tube area (inches²)

In the above equations the tube diameter (D) and the orifice area (A) will be constants for any fixed point in a system and, in addition, the kinematic viscosity ($\nu$) of a particular type of fluid will be a constant as long as the temperature of the fluid remains unchanged. Consequently, the Reynold's Number characterizing the fluid flow at a fixed point in a system is directly dependent upon the rate at which the fluid is flowing past that fixed point.

It has been generally recognized that laminar fluid flow exists when the Reynold's Number is below 2000 and that turbulent flow exists when the Reynold's Number exceeds 5000. A transitional type of fluid flow, which is neither truly laminar nor truly turbulent in character, is effected when the Reynold's Number is below 5000 and above 2000. It will therefore be seen that while most fluid systems are normally designed to produce a Reynold's Number below 2000, an effective flushing effect may be initiated within the system if means are made available to increase the fluid flow rate within the system a sufficient amount to produce a fluid flow characterized by a Reynold's Number in excess of 5000.

Others have previously taken advantage of this situation to flush contamination from fluid systems. The usual practice has been to disconnect the normal fluid pressure source from the system and to replace this with an auxiliary fluid pressure source capable of driving fluid through the system at an increased flow rate. Since various foreign particles frequently become lodged within the system against even a turbulent flow in one direction, it has often been the practice to flush the system in one direction, to reverse the direction of the auxiliary fluid pressure source within the system and then to flush the system in the other direction.

While this method has proved satisfactory in many applications, there are inherently associated therewith various limitations which seriously affect the economics, reliability and effectiveness of such a method. First, this method requires the availability of a high flow capacity pump and associated power facilities in addition to the normal fluid pressure source and associated power facilities of the system. In addition, an auxiliary pump is capable of forcing the fluid through the system in only one direction at a time and, consequently, must be disconnected, reversed and reconnected in order for the system to be flushed in both directions. This type of reverse flushing is not only more time-consuming but also far less effective than the type provided herein.

It is therefore a primary object of the present invention to provide an apparatus whereby the pressure source normally employed in a fluid system may be utilized to effect turbulent fluid flow through the system. In addition, an apparatus is provided for continuously and automatically reversing the direction of turbulent fluid flow through a fluid system. This invention provides an apparatus capable of creating turbulent fluid flow in a fluid system while permitting the continuous removal of contamination from the fluid by passing the fluid through a filter under relatively low velocity conditions. A reliable, inexpensive and lightweight apparatus is provided which is capable of creating alternating directional turbulent flow within a fluid system.

These and other objects and advantages of this invention will become apparent as the following description is read in connection with the accompanying single drawing, which is a diagrammatic illustration of the fluid system decontamination process and apparatus of the invention.

Briefly, this invention comprises connecting a flow amplifier into the fluid system to be decontaminated substantially immediately downstream from the system's fluid pressure source and connecting a filter into the fluid system substantially immediately upstream from the system's reservoir. The flow amplifier employs a reciprocating piston assembly which alternately directs increased fluid flow in opposite directions through the fluid system thereby effectively flushing contamination within the system. An amount of fluid equivalent to the amount of fluid delivered into the flow amplifier from the system's fluid pressure source is forced from the flow amplifier into the fluid system and returned to the system's reservoir across the aforesaid filter at a reduced flow rate. Contamination flushed from the system is thereby collected in the filter.

Referring now to the drawing in detail, a typical fluid system has been diagrammatically illustrated by lines 2, 3, 4, 5, 6, a reservoir 7, line 8 and a pump 9, all of which are connected in series relationship. The pump 9 is driven by a motor 10 to direct fluid through the system in a counterclockwise direction as viewed in the drawing. No check valves have been shown in the typical fluid system illustrated; however, if check valves are employed therein, they should be of the type which are controllable to permit reverse flow of fluid therethrough such as the valve Model No. 5940 produced by the Tactair Valve Division, Aircraft Products Company of Bridgeport, Pennsylvania.

A valve 11 is provided in line 2 in close proximity to the fluid pump 9. Similarly, valves 12 and 13 are provided in the lines 4 and 6, respectively, the latter being located substantially immediately upstream from the reservoir 7. Being provided with a valve 14, a line 15 connects a point in the line 2 between the line 3 and the valve 11 to the line 6 at a point which is upstream from, and in the immediate vicinity of, the valve 13. Lines 16 and 17, terminating in quick disconnect adaptors 18 and 19, respectively, are coupled to the line 6 on either side of the valve 13. Connected to the line 4 on either side of, and in the immediate vicinity of, the valve 12 are lines 20 and 21 which terminate in quick disconnect adaptors 22 and 23, respectively. A line 24 terminating in a quick disconnect adaptor 25 is coupled to the line 2 between the pump 9 and the valve 11.

A filter 26 and a relief valve 27 are provided in a line 28, the ends of which terminate in quick disconnect adaptors 29 and 30 which are mated to the quick disconnect adaptors 18 and 19, respectively. Coupled to the line 28 by a line 31, which includes a valve 32, is a pressure gauge 33.

Adapted to operate in conjunction with the typical fluid system diagrammatically illustrated in the drawing, in a manner hereinafter to be described in detail, is a flow amplifier 34. This flow amplifier 34 includes a cylinder block 35 which houses three axially aligned and interconnected piston cylinders 36, 37 and 38, the central piston cylinder 37 being larger than the other two. Slideably mounted within the cylinder block 35 is a piston assembly 39 comprising a shaft 40 having a piston 41 mounted normally at the center thereof and pistons 42 and 43 mounted normally at either end thereof. The cylinder block 35 and the pistons 41, 42 and 43 are designed in a manner such that the pistons effect fluid seals with the inner walls of the three cylinders 37, 36 and 38, respectively, of the cylinder block. In order to prevent severe banging of the piston 41 against the inner faces 44 and 45 of the piston cylinder 37, the shaft 40 is provided with tapered sections 46 and 47 at points adjacent to, and on either side of, the piston 41. As the piston 41 approaches its extreme positions within the cylinder 37, these tapered sections 46 and 47 vary the orifice size to create an increasing back pressure against the piston which decelerates the motion thereof.

Sealing the ends of the cylinder block 35 are plugs 48 and 49, which are internally provided with cylindrical cavities 50 and 51, respectively, to house pistons 52 and 53, respectively. A pin 54 is axially mounted to the piston 52 and a pin 55 is axially mounted to the piston 53 such that the ends of each pin extend through apertures suitably provided in its respective plug 48 or 49. A tubular passage 56 in the plug 48 connects the cylindrical cavity 50 to the piston cylinder 36 while the cylindrical cavity 50 is vented to the atmosphere by a tubular passage 57 in the plug 48. Similarly, tubular passages 58 and 59 provided in the plug 49 connect the cylindrical cavity 51 to the piston cylinder 38 and to the atmosphere, respectively.

Fluid passages 60 and 61 are located in the cylinder block 35 at points which are always intermediate of the piston 41 and the pistons 42 and 43, respectively. Located in the cylinder block 35 at points which are always intermediate of the piston 42 and the plug 48 and the piston 43 and the plug 49, respectively, are fluid passages 62 and 63.

A line 64, provided with a thermostat controlled immersion heater 65 and a quick disconnect adaptor 66, connects the fluid passage 60 of the flow amplifier 34 to the quick disconnect adaptor 22 of the line 20 while the line 67, including an immersion heater 68 and a quick disconnect adaptor 69 connects the fluid passage 61 of the flow amplifier to the quick disconnect adaptor 23 of the line 21. Connected to the line 64 by a line 70 is a pressure gauge 71 and a valve 72 while a pressure gauge 73 and a valve 74 are similarly connected to the line 67 by a line 75. The lines 64 and 67 are vented to the atmosphere by a line 76 including a valve 77 and a line 78 including a valve 79, respectively, for purposes of sample taking.

Lines 80 and 81 connect one side of a two-position four-way open center solenoid valve 82 to fluid passages 62 and 63, respectively, of the flow amplifier 34. The solenoid valve Model No. 20220 manufactured by the Sterer Engineering and Manufacturing Company of Los Angeles, California or any equivalent solenoid valve may be satisfactorily employed for this purpose. The other side of the solenoid valve 82 is connected to a line 83, which terminates in a quick disconnect adaptor 84 mated to the quick disconnect adaptor 25, and to one side of a two position three-way open center solenoid valve 85 by a line 86. In this case the solenoid valve 85 may be the Model No. 28300-8 produced by the Adel Division, General Metals Corporation of Burbank, California or any similar type valve. The other side of the solenoid valve 85 is connected to the lines 64 and 67 by lines 87 and 88 and through check valves 89 and 90, respectively. Included in the two-position four-way open-center solenoid valve 82 is a spring 91 which acts to position the solenoid valve so that fluid passing through the line 83 is directed into the line 80 and fluid passing through the line 81 is returned to the line 86 whenever the solenoid 92 of the valve 82 is not energized. A spring 93 of the solenoid valve 85 acts to position the solenoid valve so that fluid flowing thereinto through the line 86 is directed into the line 88 whenever the solenoid 94 of the valve is not energized. The open center feature of the particular solenoid valves 82 and 85 illustrated in the drawing permits these valves to be moved from one position to the other with a minimum disruption of the fluid flow from the pump 9.

An electrical lead 95 couples one side of a direct current power source 96 to one terminal of the coil 97 of a two-pole double-throw relay 98. The other side of the direct current power source 96 is connected to one contact of a switch A of the relay 98 by a line 99 which includes a switch 100. Coupling the second contact of the switch A to one terminal of the solenoid 92 is an electrical lead 101. Lead 102 connects the other terminal of the solenoid 92 to the electrical lead 95. The solenoid 94 of the solenoid valve 85 is connected in parallel with the solenoid 92 of the solenoid valve 82 to the leads 101 and 102 by electrical leads 103 and 104, respectively.

Interposed in a lead 105 between the line 99 and the second terminal of the coil 97 of the relay 98 is a normally open switch 106. This switch 106 is positioned such that the pin 55 will act against its arm to close the switch when the piston 53 is driven by the piston 43 to its farthest extent in a right-hand direction as viewed in the drawing within the cylindrical cavity 51. Coupled between the lead 99 and one contact of a switch B of the relay 98 by a lead 107 is a normally closed switch 108. This switch 108 is positioned such that its arm is activated by the pin 54 to open the switch when the piston 52 is driven to its farthest extent in a left-hand direction as viewed in the drawing within the cylindrical cavity 50. Line 109 electrically connects the arm 110 of the switch B of the relay 98 to the line 105.

During normal operation of the typical fluid system illustrated, the quick disconnect adaptors 66, 69 and 84 are disconnected from the quick disconnect adaptors 22, 23 and 25, respectively, the valves 11, 12 and 13 are open and the valve 14 is closed. When the motor 10 is energized to drive the pump 9, fluid is drawn from the reservoir 7 through the line 8 and propelled through lines 2, 3, 4, 5 and 6 to the reservoir 7.

When it has been determined to be desirable to decontaminate the fluid system, the motor 10 is de-energized at a convenient interval in the system's operation in order to shut down the pump 9. Each check valve normally employed in the fluid system is converted to its position which permits reversed flow of fluid therethrough. The flow amplifier 34 is connected to the lines 20, 21 and 24 by the quick disconnect adaptors 66, 69 and 84, respectively. The filter 26 is connected into the system by coupling the quick disconnect adaptors 29 and 30 of the line 28 to the quick disconnect adaptors 18 and 19 of the lines 16 and 17, respectively. The valves 11, 12 and 13 are closed and the valve 14 is opened. The setting of the relief valve 27 should be adjusted so that fluid from the filter 26 will be returned to the reservoir 7 at a pressure which is slightly higher than the pressure drop in the lines between the filter and either side of the flow amplifier 34.

The switch 100 is then closed and the immersion heaters 65 and 68 and the motor 10 energized. Since the solenoids 92 and 94 are not energized when the piston assembly 39 is positioned within the cylinder block 35 as shown in the drawing, the force of the springs 91 and 93 will cause the solenoid valves 82 and 85 to be positioned as illustrated. At this time, fluid from the pump 9 is directed by the solenoid valve 82 through the line 80 into the piston cylinder 36 and fluid from the piston cylinder 38 is returned through the solenoid valves 82 and 85 into the line 88.

It will be noted that the fluid pressure within the piston cylinders 36 and 38 is directed into the cylindrical cavities 50 and 51 of the plugs 48 and 49 through the tubular passages 56 and 58, respectively. Since the cylindrical cavities 50 and 51 are vented to the atmosphere by the tubular passages 57 and 59, respectively, the fluid pressure against the pistons 52 and 53 causes these pistons to be driven to their innermost positions within the flow amplifier 34 when no external force is directed against the pins 54 and 55.

The force of the fluid within the piston cylinder 36 acts against the piston 42 to drive the piston assembly 39 in a right-hand direction as viewed in the drawing, thereby forcing an increased fluid flow through the line 67 and the immersion heater 68 into line 4. Valves 11 and 12 being closed, the fluid flowing into the line 4 from the cylinder 37 of the flow amplifier 34 is directed through the lines 3, 15, 5, 4, 20 and 64 thereby being returned to the piston cylinder 37. Simultaneously, as the piston assembly 39 is driven in the right-hand direction, fluid contained in the piston cylinder 38 is forced through the line 81, the solenoid valve 82, the line 86, the solenoid valve 85, the line 88 and the check valve 90 into the line 67. Since the amount of fluid thereby introduced into the fluid system through the line 67 cannot be returned to the piston cylinder 37, it is forced through the filter 26 in the line 28 at a reduced flow rate and returned to the reservoir 7.

As the piston assembly 39 approaches its farthest extent within the cylinder block 35 in a right-hand direction, the piston 43 contacts the pin 55 and drives the pin and its associated piston 53 in a right-hand direction closing the normally open switch 106. When the switch 106 is closed, the coil 97 is energized from the direct current power source 96 closing the switches A and B of the relay 98. The switch A energizes the solenoids 92 and 94 which drive the valves 82 and 85 to their second positions wherein fluid from the pump 9 is directed into the line 81 and the fluid passing through the valves from line 80 is directed into line 87. The force of the fluid within the piston cylinder 38 acting against the piston 43 causes the piston assembly 39 to be displaced within the cylinder block 35 in a left-hand direction as viewed in the drawing. When the piston 43 has traveled a sufficient distance from the plug 49 so as to no longer be in contact with the pin 55, the pin and its associated piston 53 will have been returned to their original positions within the plug 49 by the pressure of the fluid entering the cylindrical cavity 51 through the tubular passage 58. This action of the pin 55 permits the switch 106 to resume its normally open position; however, since the coil 97 of the relay 98 is now connected through the switch B to the direct current power source 96, the solenoids 92 and 94 are still energized by the power source 96 through the switch A of the relay. As the piston assembly 39 travels in a left-hand direction, fluid is circulated from the piston cylinder 37 through the line 64 and the immersion heater 65 into the line 4 of the fluid system. This increased fluid flow is circulated through the fluid system in a counterclockwise direction as viewed in the drawing, being returned therefrom to the piston cylinder 37 by the line 67. Simultaneously, an amount of fluid equal to the amount being directed from the pump 9 into the piston cylinder 38 of the flow amplifier 34 is forced from the piston cylinder 36 and passed through the line 80, the solenoid valve 82, the line 86, the solenoid valve 85, the line 87 and the check valve 89 into the line 64. An equivalent amount of fluid is directed by the line 28 through the filter 26, the relief valve 27 and returned to the reservoir 7.

As the piston 42 approaches its farthest left-hand position within the cylinder block 35, it contacts the pin 54 driving it and its associated piston 52 in a left-hand direction, the pin 54 contacting the arm of the switch 108 causing the same to be opened. When the switch 108 is open, the solenoids 92 and 94 are de-energized and the springs 91 and 93 return the solenoid valves 82 and 85 to their original positions, respectively, the fluid again being directed from the pump 9 into the piston cylinder 36.

This operation is automatically continued to cause an alternating turbulent flow of fluid through the fluid system, any contamination therein being collected in the filter 26. It is important to note that direction reversal of the fluid through the system is accomplished with virtually no time lag whatsoever being introduced into the system. Fluid samples may be withdrawn from the system through the lines 76 and/or 78 by the operation of the valves 77 and/or 79, respectively, and subsequently tested to determine the amount of contamination remaining in the system.

The operation of the relief valve 27 may be checked by opening the valve 32 and taking readings from the pressure gauge 33 as the relief valve opens and closes. Pressure drops through the system in both directions may be monitored by the opening of the valves 72 and 74 and taking readings from the pressure gauges 71 and 73.

When the fluid has been decontaminated, the motor 10 is de-energized to shut down the pump 9. The valves 11, 12 and 13 are returned to their normally open position and the valve 14 is returned to its normally closed position. The flow amplifier 34 is disconnected from the fluid system by disconnecting the quick disconnect adaptors 66, 69 and 84 from the quick disconnect adaptors 22, 23 and 25, respectively. The fluid system is now ready to resume normal operation.

The increase in fluid flow in the lines 64 and 67 between the flow amplifier 34 and the connections to the lines 87 and 88, respectively, is in direct proportion to the effective face area of the piston 41; i.e., the total area of one side of the piston less the cross sectional area of the shaft 40 at the point where it connects to the piston 41, with respect to the face areas of the pistons 42 and 43. Reurn fluid flow from either the cylinder 36 or the cylinder 33 is also additive to the increased flow from the cylinder 37 through a segment of the fluid system in the direction of flushing. The flow amplifier 34 is therefore designed such that the increased flow in the lines 64 and 67, and consequently in the lines of the fluid system being decontaminated, is sufficient to produce turbulent flow therein. The use of the immersion heaters 65 and 68 is optional, but desirable in order to decrease the kinematic viscosity ($\nu$) of the fluid flowing through the system to thereby effect an increase of the Reynold's Number ($Re$) of the fluid flow.

The continual cycling of a turbulent fluid flow in reverse directions through the fluid system is extremely effective in removing foreign particles therefrom. In addition, since the fluid is passed through the filter 26 at a relatively low velocity, the foreign particles are effectively removed from the system. The fact that an auxiliary fluid pressure source and auxiliary power facilities are not required to produce turbulent fluid flow through the system permits fluid systems to be decontaminated using equipment lighter in weight and far less expensive than heretofore possible.

This invention may be performed and/or embodied in other ways without departing from the spirit or essential character thereof. For instance, while the embodiment of the invention illustrated permits the flow amplifier and the filter to be quickly connected into and disconnected from the fluid system to be decontaminated, in many instances it may be desirable to have these components permanently designed into the system. However, in most cases the former method will be desirable since it permits one set of flushing equipment to be employed to decontaminate many different fluid systems. The process and embodiments of the invention described herein are therefore to be considered as in all respects illustrative and not restrictive, the scope of the invention being indicated by the appended claims, and all changes which come within the meaning and range of equivalency of the claims are intended to be embraced therein.

The invention claimed is:

1. In an apparatus for removing contamination from a fluid system, said fluid system including a fluid pressure source and in which check valves employed therein are controllable to permit reverse fluid flow therethrough, the improvement comprising:
   (a) a flow amplifier connected into said fluid system substantially immediately downstream from said fluid pressure source, said flow amplifier including a cylinder block containing three axially aligned piston cylinders opening into each other, the central cylinder being larger in diameter than the others, and a rigid piston assembly slideably operable within said cylinder block including a shaft axially disposed within said three piston cylinders with a piston normally mounted thereon midway between the ends thereof and at each end thereof in a manner whereby each said piston effects a fluid seal with the inner wall of its respective said piston cylinder;
   (b) a first means for alternately directing the fluid flow from said fluid pressure source against the outer faces of the smaller said pistons of said flow amplifier, respectively; and
   (c) a second means for directing the fluid flow from one side of the larger said piston within said larger cylinder of said flow amplifier through a substantial segment of said fluid system and then into said larger cylinder on the opposite side of said larger piston, alternately, as said fluid flow from said fluid pressure source is directed alternately against said outer faces of said smaller pistons.

2. The apparatus of claim 1 including additionally a third means for heating the fluid flowing through said substantial segment of said fluid system.

3. Apparatus for removing contamination from a fluid system, said fluid system including a fluid reservoir connected to a fluid pressure source and in which check valves employed therein are controllable to permit reverse fluid flow therethrough comprising:
   (a) a filter connected in series relationship within said fluid system substantially immediately upstream from said fluid reservoir;
   (b) a flow amplifier connected into said fluid system substantially immediately downstream from said fluid pressure source, said flow amplifier including a cylinder block containing three axially aligned piston cylinders opening into each other, the central cylinder being larger in diameter than the others, and a rigid piston assembly slideably operable within said cylinder block including a shaft axially disposed within said three piston cylinders with a piston normally mounted thereon midway between the ends thereof and at each end thereof in a manner whereby each said piston effects a fluid seal with the inner wall of its respective said piston cylinder;
   (c) a first means for alternately directing the fluid flow from said fluid pressure source against the outer faces of the smaller said pistons of said flow amplifier;
   (d) a second means for directing the fluid flow from one side of the larger said piston within said larger cylinder of said flow amplifier through a substantial segment of said fluid system and then into said larger cylinder on the opposite side of said larger piston, alternately, as said fluid flow from said fluid pressure source is directed alternately against said outer faces of said smaller pistons; and
   (e) a third means for directing the fluid flow from the smaller said piston cylinder of said flow amplifier, which contains the smaller said piston the outer face of which is not immediately connected to said fluid pressure source, alternately through the portions of said fluid system between said flow amplifier and said filter connection and to said reservoir through said filter wherein said contamination is collected.

4. The apparatus of claim 3 including additionally a fourth means for heating the fluid flowing through said substantial segment of said fluid system.

5. Apparatus for removing contamination from a fluid system, said fluid system including a fluid reservoir connected to a fluid pressure source and in which check valves employed therein are controllable to permit reverse fluid flow therethrough comprising:
   (a) a filter connected in a series relationship within said fluid system substantially immediately upstream from said fluid reservoir;
   (b) a fluid connection between a point in said fluid system substantially immediately downstream from said fluid pressure source and a point in said fluid system substantially immediately upstream from said filter;
   (c) a first means for disconnecting said fluid pressure source from said fluid system substantially immediately upstream from said fluid connection;
   (d) a flow amplifier including a cylinder block containing three axially aligned piston cylinders opening into each other, the central cylinder being larger in diameter than the others, a rigid piston assembly slideably operable within said cylinder block including a shaft axially disposed within said three piston cylinders with a piston normally mounted thereon midway between the ends thereof and at each end thereof in a manner whereby each said piston effects a fluid seal with the inner wall of its respective said piston cylinder, a first and a second fluid passage each communicating with the interior of said cylinder block at a point always intermediate of the larger said piston and one of the smaller said pistons, respectively, and a third and a fourth fluid passage each communicating with one of the smaller said piston cylinders at a point always intermediate of a closed end thereof and said piston slideably operable therein, respectively;

(e) a first and a second fluid line each having one end thereof connected to said first and said second fluid passage of said cylinder block, respectively, and the other end thereof connected to said fluid system such that fluid flowing into said fluid system through either said first or said second fluid line flows through a substantial segment of said fluid system before being removed therefrom through the other said first or said second fluid line;

(f) a third fluid line having one end thereof connected to said first fluid line and a fourth fluid line having one end thereof connected to said second fluid line such that the amount of fluid entering said fluid system from either said third or said fourth fluid line is directed to said reservoir through said filter;

(g) a fifth and a sixth fluid line each having one end thereof connected to said third and said fourth fluid passages of said cylinder block, respectively; and (h) a second means for alternately connecting the open ends of said fifth and said sixth fluid lines directly to said fluid pressure source and to the open end of either said fourth or said third fluid line, respectively, each time said piston assembly reaches either end of its axial displacement within said cylinder block of said flow amplifier.

6. The apparatus of claim 5 wherein said second means includes a two-position four-way solenoid valve interconnected in said fifth and said sixth fluid lines, the solenoid thereof being energized when said piston assembly is driven to its farthest extent in one direction within said cylinder block of said flow amplifier and deenergized when said piston assembly is driven to its farthest extent in the opposite direction within said cylinder block.

7. The apparatus of claim 6 wherein said second means includes additionally a pin slideably mounted axially at each end of said cylinder block in a manner so as to have one end thereof contact the smaller said piston most closely associated therewith prior to said piston's reaching its farthest extent within said cylinder block in the direction of said pin, to be driven by said piston axially as said piston travels farther towards its said farthest extent and to return to its original position when not restrained therefrom by said piston.

8. The apparatus of claim 7 wherein said second means includes additionally a two-position three-way valve interconnected between the open ends of said third and said fourth fluid lines and said two-position four-way solenoid valve.

9. In an apparatus for removing contamination from a substantial segment of a fluid system wherein a specific amount of fluid flows through said substantial segment of said fluid system during periods of normal system operation, said fluid system including a fluid pressure source, the improvement comprising:

(a) a flow amplifier including at least one piston driven by the fluid from said pressure source connected to a larger flow amplifying piston, said flow amplifier connected into said fluid system between said fluid pressure source and said substantial segment of said system; and (b) means for directing the amplified fluid flow from said larger flow amplifying piston of said flow amplifier through said substantial segment of said system and thence returning said amplified fluid flow to said flow amplifier.

10. The apparatus of claim 9 including additionally means for directing said amplified fluid flow from said flow amplifier through said substantial segment of said system thence to said flow amplifier continuously in alternate directions.

References Cited by the Examiner
UNITED STATES PATENTS

| | | | |
|---|---|---|---|
| 38,531 | 5/63 | Coates | 103—51 |
| 1,820,236 | 8/31 | Loud | 103—51 X |
| 2,222,516 | 11/40 | Powell | 134—169 |
| 2,997,049 | 8/61 | Thomas | 134—169 |

CHARLES A. WILLMUTH, *Primary Examiner.*

G. J. NORTH, *Examiner.*